US011795921B2

(12) United States Patent
Knoop et al.

(10) Patent No.: US 11,795,921 B2
(45) Date of Patent: Oct. 24, 2023

(54) NACELLE OF A WIND TURBINE, AS WELL AS A WIND TURBINE HAVING A NACELLE AND METHOD FOR THE MAINTENANCE OF A WIND TURBINE OF THIS TYPE

(71) Applicant: Wobben Properties GmbH, Aurich (DE)

(72) Inventors: Frank Knoop, Aurich (DE); Wilko Gudewer, Norden (DE); Joan Kreikenbaum, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/966,732

(22) PCT Filed: Jan. 24, 2019

(86) PCT No.: PCT/EP2019/051726
§ 371 (c)(1),
(2) Date: Jul. 31, 2020

(87) PCT Pub. No.: WO2019/149611
PCT Pub. Date: Aug. 8, 2019

(65) Prior Publication Data
US 2020/0355167 A1 Nov. 12, 2020

(30) Foreign Application Priority Data
Feb. 2, 2018 (DE) ...................... 10 2018 102 428.2

(51) Int. Cl.
*F03D 80/80* (2016.01)
*F03D 80/50* (2016.01)
*F03D 9/25* (2016.01)

(52) U.S. Cl.
CPC ............. *F03D 80/80* (2016.05); *F03D 80/50* (2016.05); *F03D 9/25* (2016.05); *F05B 2230/61* (2013.01);
(Continued)

(58) Field of Classification Search
CPC . F03D 80/80; F03D 80/50; F03D 9/25; F05B 2230/61; F05B 2230/80; F05B 2240/14; Y02E 10/72; Y02P 70/50
See application file for complete search history.

(56) References Cited

U.S. PATENT DOCUMENTS 5,649,392 A 7/1997 Svenning
7,748,547 B2* 7/2010 Llorente Gonzalez ...................... B66C 23/207
212/179

(Continued)

FOREIGN PATENT DOCUMENTS

CN 1989341 A 6/2007
CN 201705582 U 1/2011
(Continued)

*Primary Examiner* — Christopher Verdier
(74) *Attorney, Agent, or Firm* — SEED INTELLECTUAL PROPERTY LAW GROUP LLP

(57) ABSTRACT

A nacelle of a wind turbine comprising a machine carrier which is adapted to be installed on a tower of the wind turbine and to carry a generator and a rotor hub of the wind turbine, a working frame installed on the machine carrier and having one or more working planes, and a nacelle housing which encloses the machine carrier and the working frame for protection from weather influences, wherein the nacelle housing has a nacelle base compartment accessible from the working frame. It is proposed that the nacelle base compartment is adapted to be lowerable relative to the working platform. A wind turbine and a maintenance method is also provided.

15 Claims, 8 Drawing Sheets

(52) U.S. Cl.
CPC ....... *F05B 2230/80* (2013.01); *F05B 2240/14* (2013.01)

(56) References Cited

U.S. PATENT DOCUMENTS

| | | | |
|---|---|---|---|
| 9,228,562 B2 | 1/2016 | Mercado Diez et al. | |
| 9,394,887 B2 | 7/2016 | Roer et al. | |
| 2011/0248506 A1* | 10/2011 | Ruiz Urien | F03D 13/10 290/55 |
| 2011/0266096 A1* | 11/2011 | Nies | B66B 9/16 187/251 |
| 2013/0334819 A1 | 12/2013 | Fricke et al. | |
| 2014/0377066 A1* | 12/2014 | Anderson | F03D 80/30 416/44 |
| 2015/0132119 A1 | 5/2015 | Fenger | |

FOREIGN PATENT DOCUMENTS

| | | |
|---|---|---|
| CN | 206319998 U | 7/2017 |
| CN | 206753830 U | 12/2017 |
| DE | 202007019340 U1 | 1/2012 |
| EP | 1291521 A1 | 3/2003 |
| EP | 2570653 A1 | 3/2013 |
| EP | 2620644 A1 | 7/2013 |
| RU | 2504687 C2 | 1/2014 |
| RU | 2596414 C2 | 9/2016 |
| WO | 2012/078494 A1 | 6/2012 |

\* cited by examiner

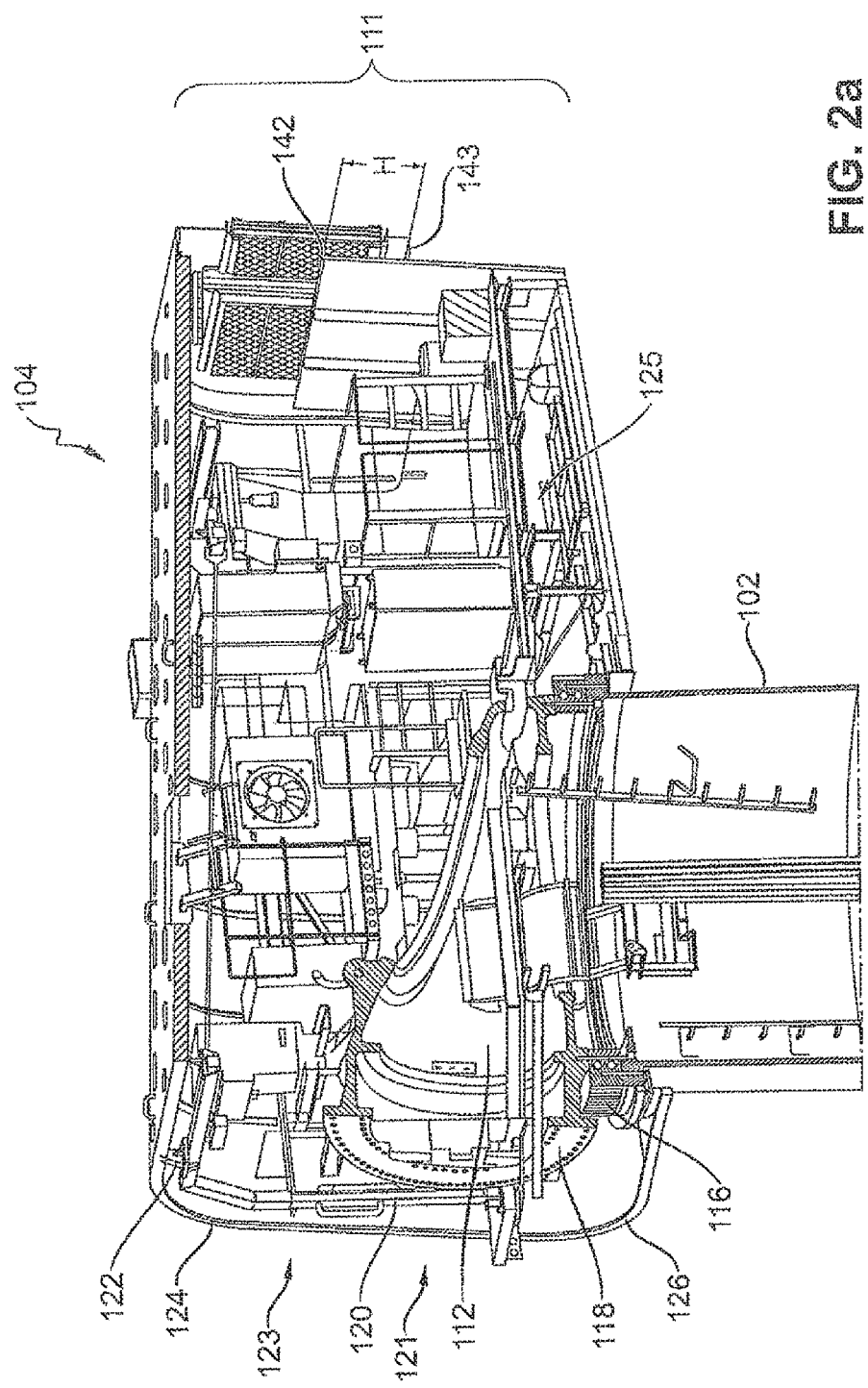

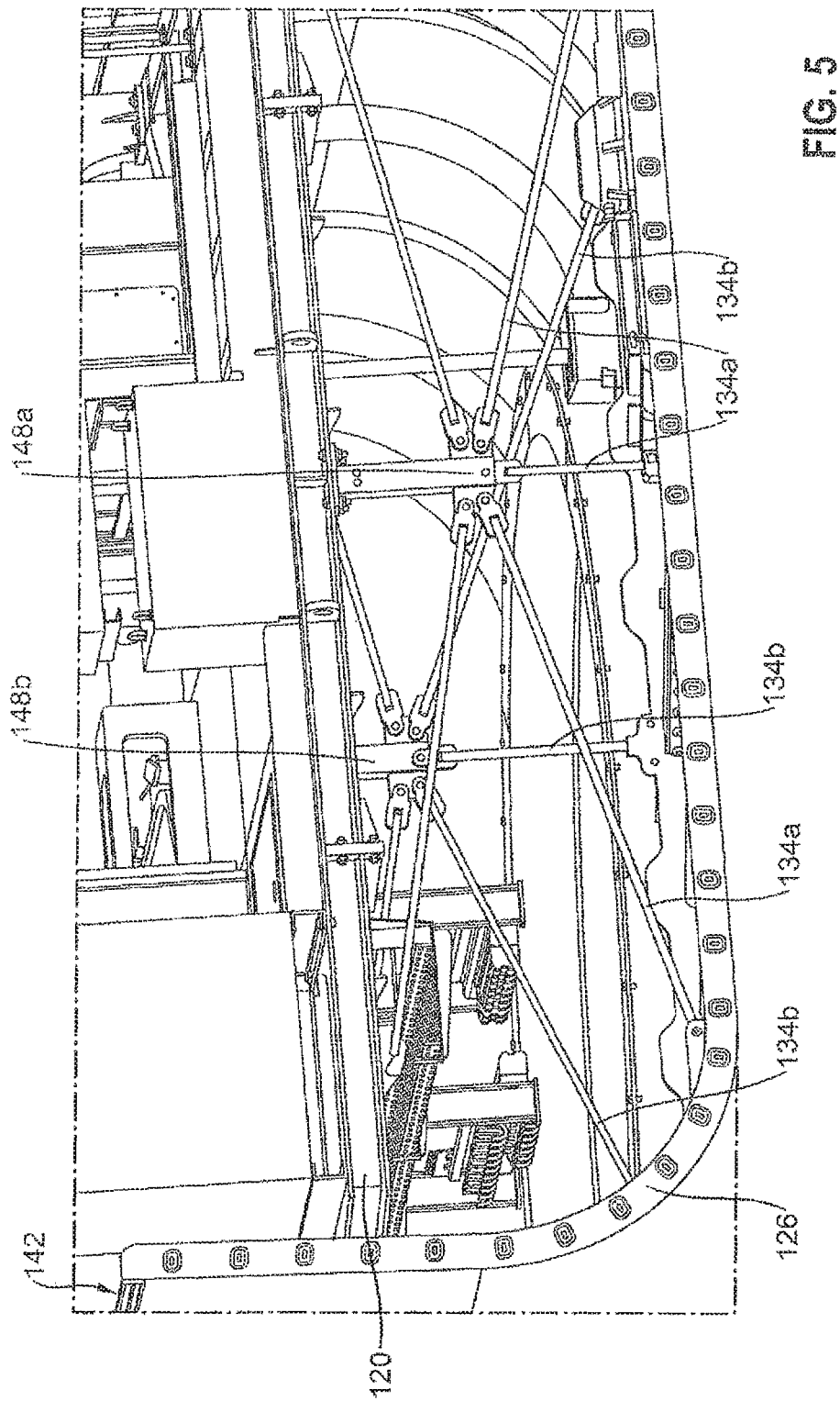

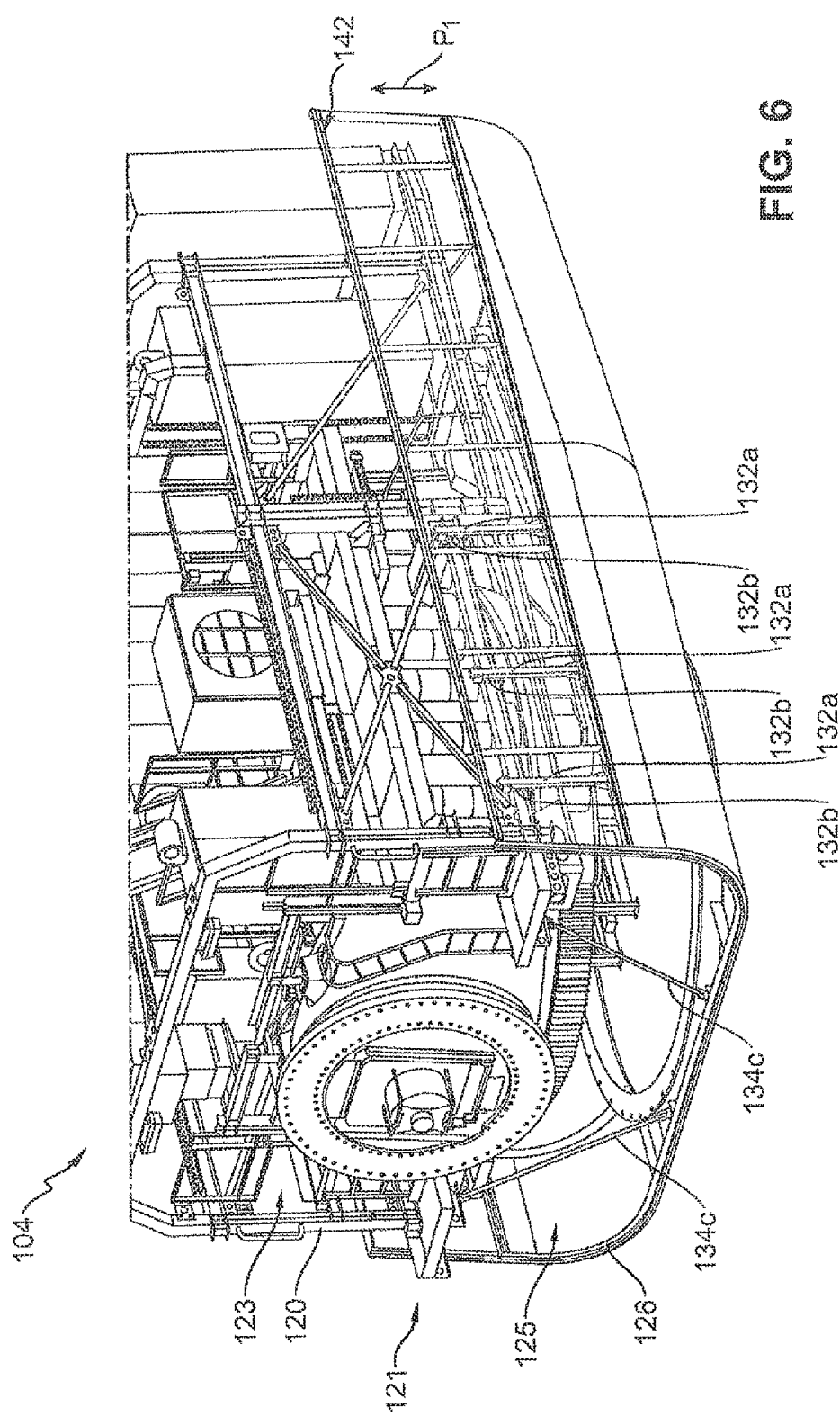

NACELLE OF A WIND TURBINE, AS WELL AS A WIND TURBINE HAVING A NACELLE AND METHOD FOR THE MAINTENANCE OF A WIND TURBINE OF THIS TYPE

BACKGROUND

Technical Field

The present invention concerns a nacelle of a wind turbine comprising a machine carrier which is adapted to be installed on a tower of the wind turbine and to carry a generator and a rotor hub of the wind turbine.

Description of the Related Art

The nacelle of a wind turbine generally houses control electronics in the form of switching and control cabinets. The nacelle possibly further houses measuring instruments for detecting the operating parameters of the wind turbine. All those components have to be disposed in the nacelle in addition to the components responsible for the movement of the wind turbine and for generating current, and for that reason working frames are usually erected around the machine carrier. Those working frames allow movement, even if restricted, within the nacelle and make it possible for the maintenance personnel to move to and fro quickly between various control or switching cabinets or other items of equipment.

The nacelle housing must perform the function of protecting the internal parts of the nacelle and in particular the electrical components disposed there from the influences of weather and to prevent the unwanted ingress of dirt or living creatures, for example, birds or insects, to the best possible extent.

In recent years wind turbines have reached considerable tower heights. The nacelle of a wind turbine is frequently several hundreds of meters above the surface on which it stands. Considerable wind loadings act on the nacelle housing at those heights. To achieve the lowest possible level of wind resistance the space available within the nacelle for free movement is usually very tight. The freedom of movement suffers from that. In particular components which are deep in the nacelle housing and which are far away from the working frame can only be reached with difficulty as a result. These include in particular the yaw drives, the yaw tooth arrangement, the tower flange and/or parts of the generator. This is found to be a disadvantage in particular for the maintenance personnel dealing with the wind turbine.

BRIEF SUMMARY

Provided is a nacelle such that access to various regions within the nacelle is made easier for maintenance personnel.

Provided is a nacelle of a wind turbine comprising a machine carrier which is adapted to be installed on a tower of the wind turbine and to carry a generator and a rotor hub of the wind turbine, a working frame installed on the machine carrier and having one or more working planes, and a nacelle housing which encloses the machine carrier and the working frame for protection from weather influences, wherein the nacelle housing has a nacelle base compartment accessible from the working frame.

Provided is a nacelle with a nacelle base compartment being adapted to be lowerable relative to the working platform. The nacelle base compartment below the working frame therefore makes it possible to pass through the entire nacelle from its front rotor-side end to the opposite end. By the nacelle base compartment being lowered that space can be used to a much greater extent than previously.

An advantageous development provides that the nacelle housing has a bottom casing which delimits the nacelle base compartment, wherein the bottom casing is adapted to be movable in height relative to the working frame. In other words that means that the total nacelle volume also varies at the same time with lowering and raising of the bottom casing defining the nacelle base compartment. When the nacelle base compartment is raised the nacelle volume is smaller by virtue of the nacelle casing being raised than in the state when the nacelle base compartment is in the lowered state.

A smaller nacelle volume automatically results in a lesser susceptibility to wind, in particular a lesser susceptibility to a cross wind. Particularly in regions in which severe cross winds are frequently to be reckoned upon the nacelle base compartment can remain in the raised state in normal operation and has to be lowered only when it has to be entered for maintenance purposes. In addition an advantage of this turbine concept is that, in erection regions in which there is no likelihood of severe cross winds, the nacelle base compartment can remain in the lowered state in normal operation, but in return can be raised if severe cross winds are expected in order to reduce susceptibility to the wind.

In a preferred embodiment one or more fixing devices are mounted between the working platform and the bottom casing. The fixing devices are preferably adapted to fix the bottom casing selectively at least in a first raised end position and preferably in a second lowered end position on the working frame.

Preferably the fixing devices respectively have a rail fixed to the bottom casing or the working frame and a rail receiving means corresponding to the rail and fixed to the respective other element, that is to say the working frame or the bottom element, and the rails are particularly preferably slidingly accommodated in the rail receiving means. The rails provide guided mobility of the bottom casing relative to the working frame and significantly facilitate handling when lowering the nacelle base compartment. Tipping or lateral deviation of the bottom casing is effectively prevented by the rails.

In a further preferred embodiment the fixing devices respectively have at least a first positively locking element, and at least for the first raised end position, a second positively locking element corresponding to the first positively locking element. Preferably the fixing devices for the second lowered end position also have a second positively locking element corresponding to the first positively locking element. The first and second positively locking elements of the fixing devices can, for example, be in the form of screw means or bolt connections. For example, through bores can preferably be provided on the rail and the rail receiving means, the bores permitting fixing of the nacelle bottom casing to the working frame both in the first end position and also in the second end position by aligned orientation of the corresponding through bores, wherein fixing in the first or the second end position respectively is achieved by insertion of the corresponding positively locking element, that is to say a bolt or a screw means.

In addition in the case of a screw means, it is possible to apply a clamping force for safeguarding purposes.

Preferably the above-described fixing devices are first fixing devices and the nacelle has one or more further fixing devices which at least in the second end position of the bottom casing can be connected to the bottom casing on the one hand and the working platform on the other hand. The second fixing devices are particularly preferably in the form of struts, in particular tensile struts. For the second fixing devices the nacelle preferably has one or more abutment supports, wherein the abutment supports are preferably oriented substantially radially to an axis of rotation of the generator in the nacelle, and therefore extend vertically downwardly and are arranged substantially centrally in the nacelle housing, particularly preferably beneath the working platform, and because the second fixing devices extend from the abutment supports in the direction of the bottom casing.

In a further preferred embodiment the bottom casing at two opposite sides has a laterally outwardly extending projection and the roof casing at two corresponding oppositely disposed sides has a laterally inwardly extending step and wherein the projection and the step are in contact with each other when the bottom casing is in the second lowered end position. The respective sides of the bottom casing and the roof casing are preferably the left-hand and right-hand sides of the nacelle housing, and optionally in addition the front and rear sides of the nacelle housing. In that respect the front side of the nacelle housing means the rotor hub side of the nacelle housing. In principle the references to left, right and front are interpreted when the nacelle housing is oriented in the position of being ready for operation.

The corresponding arrangement of projection and step between the bottom casing and the roof casing of the nacelle housing ensures that the bottom casing is held captively in the second end position by engagement behind the corresponding step in the roof casing. In addition the contact between the projection and the step serves for automatic positioning of the bottom casing relative to the roof casing, thereby facilitating fixing of the bottom casing in the second lowered end position.

An advantageous development provides that the nacelle has one or more third fixing devices which in the second end position connect the projections of the bottom casing to the steps of the roof casing. Preferably the third fixing devices are in the form of screws. The connection, particularly preferably the reversibly releasable connection, between the roof casing and the bottom casing at the location at which the steps and the projections co-operate with each other ensures that the casing portions bear sealingly against each other so that the nacelle housing reliably affords protection from the influences of the weather, without further sealing means.

Particularly preferably the projection in the roof bottom casing is in the form of an outwardly extending collar and the step in the roof casing is in the form of an inwardly extending step. That provides that the roof casing overhangs the bottom casing in a lateral direction so that this also makes it difficult for water which runs off the nacelle housing to enter.

In a preferred embodiment the nacelle has one or more hoist mechanisms, by means of which the bottom casing is coupled to the working frame, wherein the hoist mechanism or mechanisms are preferably in the form of chain hoists or cable hoists. By virtue of using one or more hoist mechanisms it is possible to lower or raise the nacelle base compartment, with the application of a low level of force. Actuation of the hoist mechanisms can be effected manually or under motor control. Motor control of the hoist mechanisms is to be preferred in particular when, in preferred embodiments, automatic lifting of the nacelle base compartment is to be effected when there are strong cross winds.

The invention has been described hereinbefore by means of a first aspect with reference to the nacelle itself. A further aspect concerns a wind turbine, a gear-less wind turbine, comprising a tower, a nacelle arranged rotatably on the tower and having a machine carrier carrying a generator and a rotor hub, wherein a number of rotor blades are arranged on the rotor hub. The generator is preferably a synchronous generator. Preferably it involves a slowly rotating generator. That is used to mean a generator involving a speed of rotation of 100 revolutions per minute or less, preferably 50 revolutions per minute or less, particularly preferably in a range of 5 to 35 revolutions per minute. The generator can be in the form of an external rotor generator or an internal rotor generator.

Preferably the generator is a multi-pole synchronous ring generator. Such a multi-pole synchronous ring generator has a multiplicity of stator teeth, in particular at least 48 stator teeth, frequently even markedly more stator teeth like in particular 96 stator teeth, 192 stator teeth or more. The magnetically active region of the synchronous generator, namely both the generator rotor and also the generator stator, is arranged in an annular region around the axis of rotation of the stator generator.

The generator is preferably separately excited.

In such a wind turbine the nacelle of the wind turbine is designed in accordance with one of the above-described preferred embodiments. Accordingly the wind turbine makes use of the same advantages and the same preferred embodiments as the nacelle, for which reason attention is directed to the foregoing description for the avoidance of repetition.

In a further aspect the invention concerns a method of maintaining a wind turbine, wherein the wind turbine has a nacelle having a nacelle housing which encloses a machine carrier and a working frame for protection from weather influences, wherein the nacelle housing has a nacelle base compartment accessible from the working frame. In particular the wind turbine or the nacelle is designed in accordance with one of the above-described preferred embodiments.

The method includes the steps: entering the nacelle housing, lowering the nacelle base compartment either before or after entering the housing from a first raised end position into a second lowered end position, and going into the nacelle base compartment when it is in the lowered end position. Lowering of the nacelle base compartment can be effected immediately before passing into the nacelle base compartment, but does not have to be. Lowering of the nacelle base compartment can also be effected at a markedly earlier time, for example, upon or after commissioning of the wind turbine. If the place of erection of the wind turbine allows the nacelle base compartment to be permanently left in the lowered state then the lowered state of the nacelle base compartment is the preferred normal position for the bottom casing of the wind turbine. Entry into the nacelle base compartment can then be repeated as frequently as may be desired without having to raise the nacelle base compartment in the meantime.

It will be noted that raising of the nacelle base compartment can be advantageous for normal operation of the wind turbine, particularly if the wind turbine is operated at locations which have the expectation of high wind loadings, in particular high cross wind loadings. It is then generally advisable for the nacelle base compartment to be left in the raised state in the normal situation. The nacelle housing concept at any event allows both variants.

Preferably the nacelle base compartment is fixed in the second end position, either temporarily or permanently, as described hereinbefore.

A preferable development of the method provides that it includes the steps: detecting the cross wind loading acting on the nacelle housing, and raising the nacelle base compartment as soon as a predetermined threshold value of the detected cross wind loading is reached or exceeded. The cross wind loading can be detected by means of anemometry, or by means of measurement of the flexural loading on the tower, the tower flange, the yaw tooth arrangement or the nacelle housing itself.

BRIEF DESCRIPTION OF THE SEVERAL VIEWS OF THE DRAWINGS

The invention is described in greater detail hereinafter by means of a preferred embodiment with reference to the accompanying Figures in which:

FIGS. 2a, 2b show diagrammatic sectional views through the nacelle of the wind turbine of FIG. 1.

DETAILED DESCRIPTION

Figure 1:
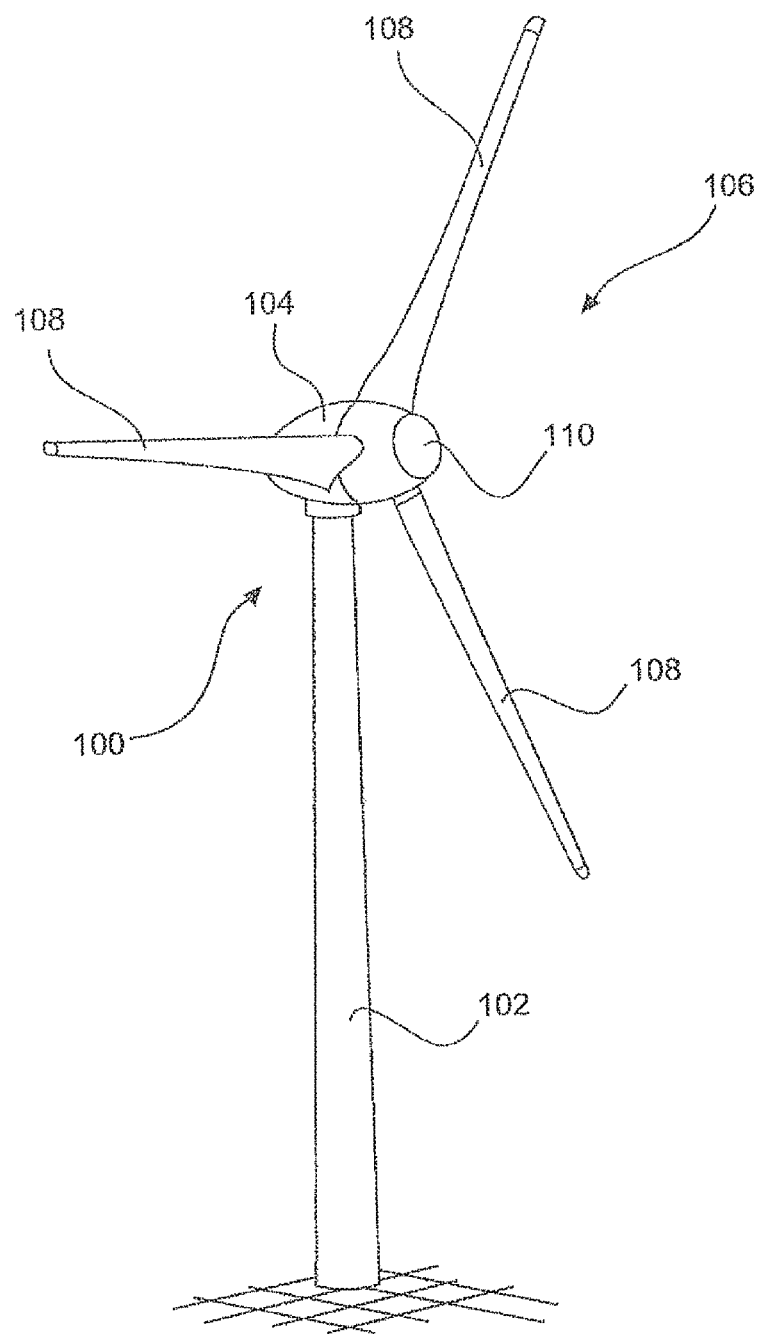
FIG. 1 shows a wind turbine according to a preferred embodiment.

FIG. 1 shows a wind turbine 100 comprising a tower 102 and a nacelle 104. Arranged on the nacelle 104 is a rotor hub 106 having three rotor blades 108 and (optionally) a spinner 110. The rotor blades 108 are arranged with their rotor blade roots on a rotor hub. The rotor hub 106 is driven in rotation by the wind in operation thereof and thereby drives a generator (not shown) in the nacelle 104.

FIG. 2a shows a partly sectional view of the nacelle 104 on the tower 102. The nacelle 104 has a nacelle housing 111 in which a machine carrier 112 is arranged. The machine carrier 112 is mounted rotatably relative to the tower 102 by means of a rotary connection having an external tooth arrangement 116. Provided on the machine carrier 112 is a connecting flange 118 for a mounting journal or trunnion, a torque bearing or comparable components to connect the generator for generating electric power and the rotor hub 106 of the wind turbine 100.

Provided on the machine carrier 112 is a working frame 120 having a plurality of working planes 121, 123 (see FIG. 6). Arranged on the working frame are various switching and control instruments as well as measurement instruments, by means of which, for example, operation of the wind turbine is controlled and monitored.

The nacelle housing 111 is of a substantially two-part structure and includes a roof casing 124 and a bottom casing 126. The roof casing 124 is fixedly mounted on the working frame 120 at corresponding support points 122. The bottom casing 126, beneath the working frame 120, defines a nacelle base compartment 125 which substantially uses all the free volume beneath the working frame.

Figure 2B:
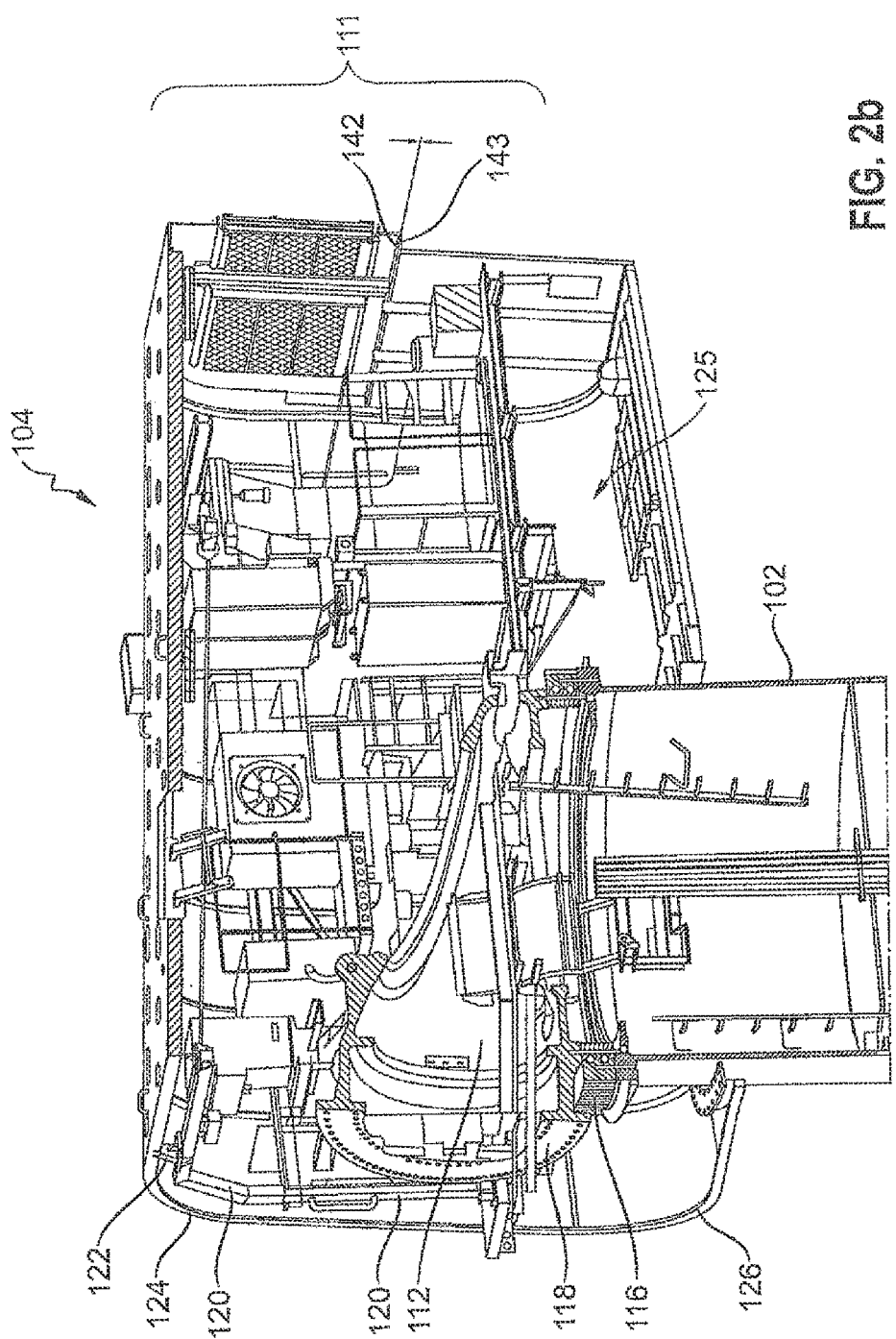

As a comparison of FIGS. 2a and 2b shows the volume of the nacelle base compartment 125 is variable. In FIG. 2b the bottom casing 125 is lowered relative to the working frame 120 by the amount H, whereby the volume of the nacelle base compartment 125 is significantly increased. In the state shown in FIG. 2b regions of the nacelle base compartment 125 are also accessible to maintenance personnel, which previously could only be reached with difficulty, for example, the tower flange with the rotary connection 116.

To prevent the bottom casing 126 from falling down the roof casing 124 has a step 143, preferably in peripherally extending relationship. The bottom casing 126 at corresponding side walls has a laterally outwardly extending projection 142, preferably also in peripherally extending relationship. In the lowered end position shown in FIG. 2b the projection 142 rests on the step 143, preferably flat thereon, and is held in position in such a way that fixing of the bottom casing 126 can be effected. Details in regard to the fixing of the bottom casing can be seen from the further Figures.

Figure 3:
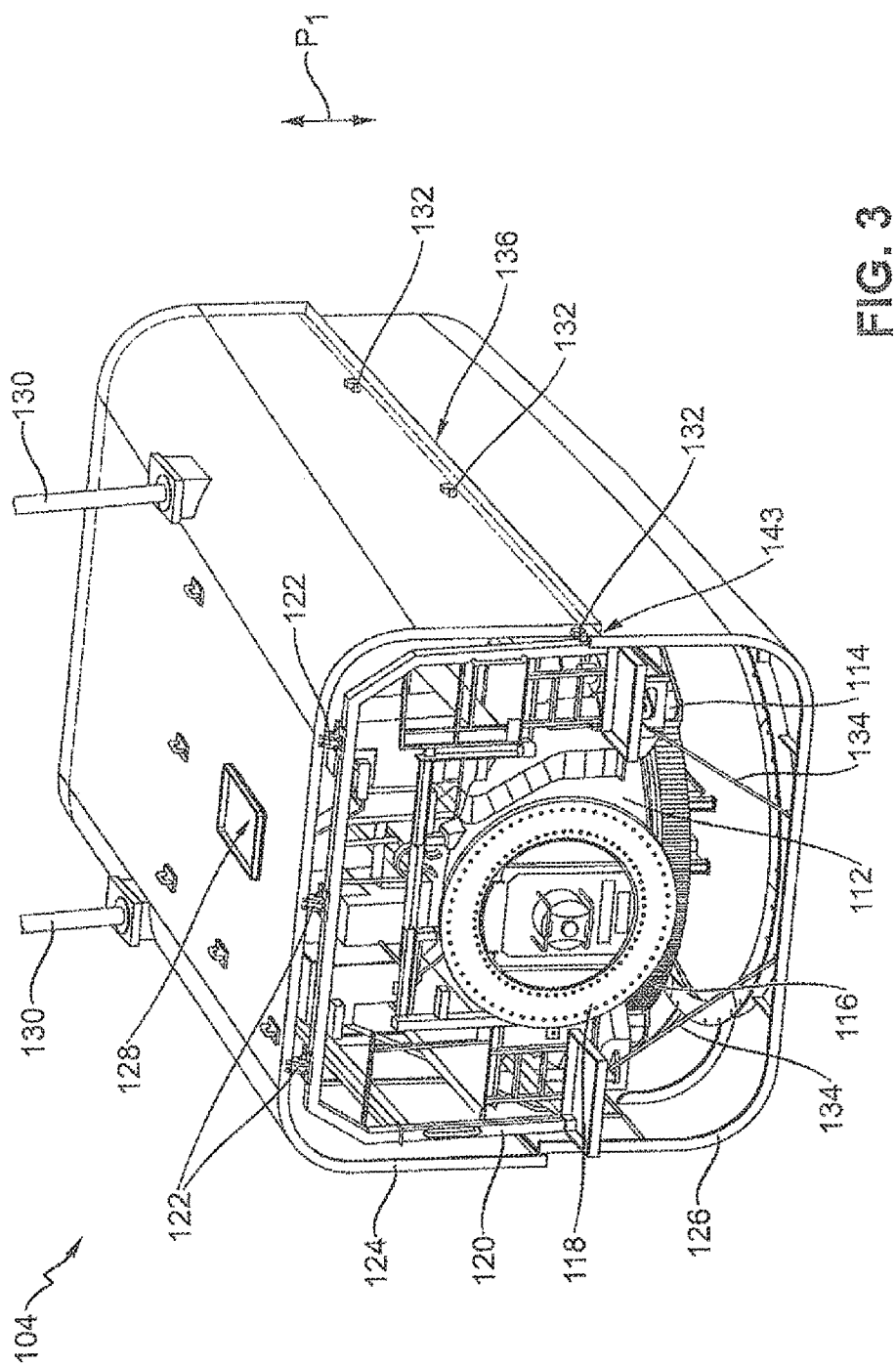
FIG. 3 shows a diagrammatic perspective view of the nacelle of FIGS. 1 and 2a to 2b, FIGS. 4a, 4b show various diagrammatic perspective views of the bottom casing of the nacelle shown in FIGS. 1 to 3, and FIGS. 5-6 show detail views of the nacelle of FIGS. 1 to 4b.

FIG. 3 shows the nacelle 104 of the wind turbine of FIG. 1 in the state shown in FIG. 2b, that is to say in the lowered second end position. The bottom casing 126 has been lowered in the direction of the arrow Pi in such a way that the projections 142 (see FIG. 4a) rest on the step 143 (see FIG. 2b).

Figure 4A:
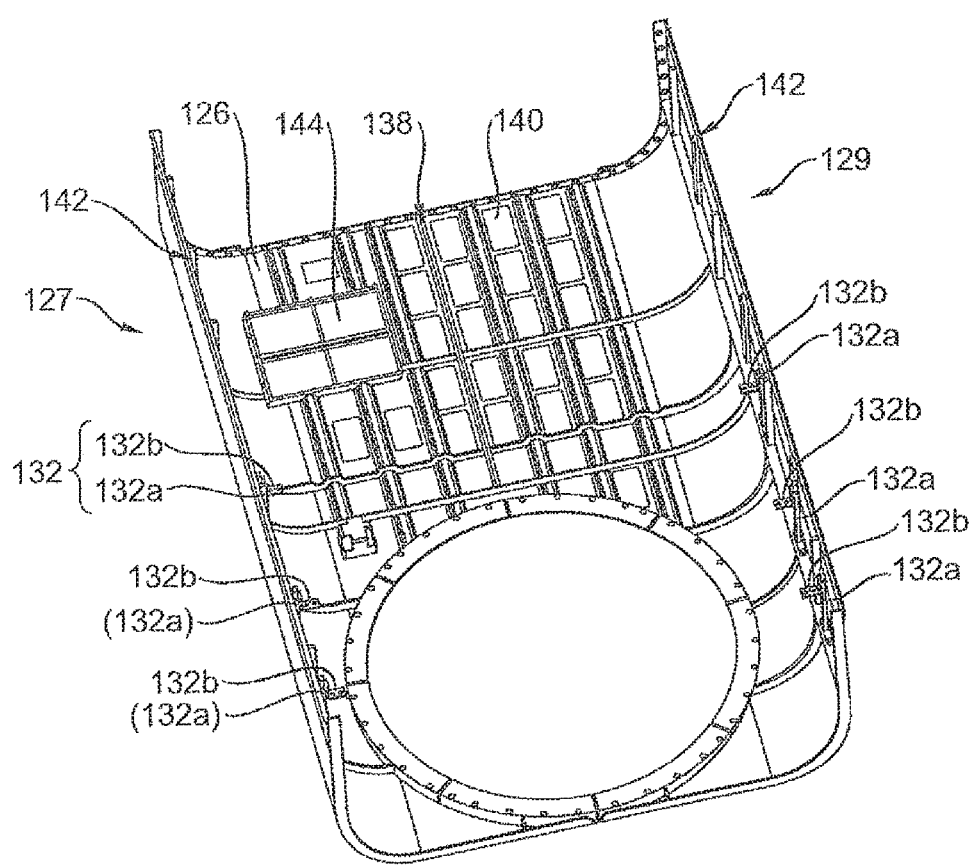

The nacelle has a plurality of first fixing devices 132 which are provided between the working frame 120 on the one hand and the bottom casing 126 on the other hand and which permit the bottom casing 126 to be fixed to the working frame 120 both in the illustrated second end position and also in the first end position (see FIGS. 4a and 6).

By virtue of the roof casing 124 and 126 engaging into each other there is an overhang 136 which reliably protects the interior of the nacelle 104 from the ingress, for example, of rainwater.

Besides the first fixing devices 132 the nacelle 104 has a number of second fixing devices 134 which are in the form of struts and by means of which the bottom casing 126 is additionally mechanically secured to the working frame 120. The struts 134 (or 134a to 134c, see FIG. 4b) are preferably provided in the nacelle 104 in such a way that only one of the ends of the struts 134 (134a to 134c) has to be disengaged if the bottom casing 126 is in the first raised end position. After lowering of the bottom casing 126 into the second lowered end position then the respective second end of the struts can be connected to the bottom casing 126 (or the frame 120, whichever), for additional securing.

In addition provided on the roof casing 126 of the nacelle 104 there are preferably one or more masts 130 on which, for example, anemometers and/or flight warning lighting devices can be installed. In addition the roof casing 124 has an entry and exit hatch 128, by means of which it is possible to have access from the working frame 120 to the roof of the nacelle 104.

As can be seen from FIG. 4a on the bottom casing 126 a plurality of regions of the flat floor 138 are provided with a non-slip coating 140 to still further improve accessibility in the nacelle base compartment 125. In addition provided in the region of the nacelle base compartment in the bottom casing 126 is an exit hatch 144 from which maintenance personnel can abseil down in the direction of the tower 102.

In addition FIG. 4a shows the projection 142 extending on the left-hand and right-hand side walls 127, 129.

Figure 4B:
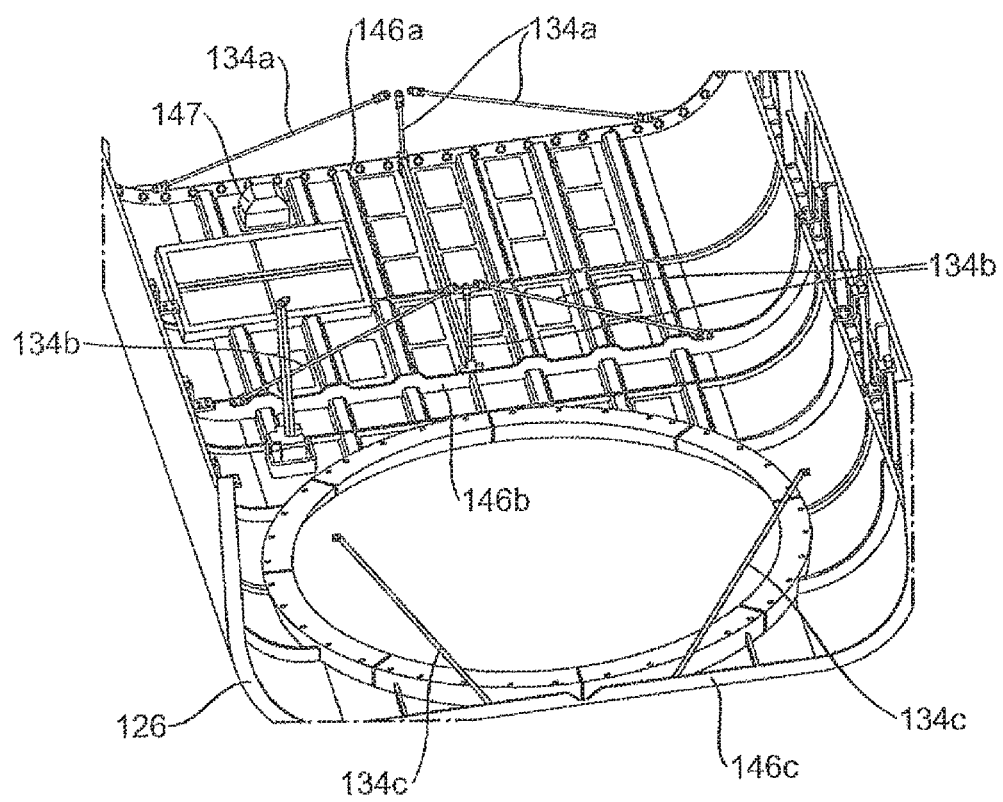

The first fixing means or element 132 each include a rail 132a fixed to the bottom casing 126 and a rail receiving means or element 132b fixed to the working frame 120 (see FIG. 6). Provided on the rail 132a and the rail receiving means 132b are respective through openings which permit the rail 132a to be fixed to the rail receiving means 132b both in the first raised end position of the bottom casing 126 and also in the second lowered end position, by means of bolts or screw connections. The rail receiving means 132b are preferably adapted to linearly slidingly guide the rails 132a and in particular to limit lateral swinging movement of the bottom casing 126 relative to the working frame 120 or relative to the roof casing 124. In particular the rail receiving means 132*b* are adapted to prevent the bottom casing 126 from tilting relative to the roof casing 124. FIG. 4*b* which shows the bottom casing 126 in a slightly shallower angle in comparison with FIG. 4*a* additionally illustrates the second fixing devices 134 which in the present embodiment are composed of a series of first tensile struts or tie bars 134*a*, a second series of tensile struts 134*b* and a third series of tensile struts 134*c*.

The first series of tensile struts 134*a* are engaged in a first reinforcing rib 146*a* of the bottom casing 126. The second series of tensile struts 134*b* are engaged in a second reinforcing rib 146*b* and the third series of tensile struts 134*c* are correspondingly engaged in a third reinforcing rib 146*c* of the bottom casing 126. Optionally a light radiating device 147 is additionally provided in the bottom casing, which, for example, can shine light inwardly into the nacelle base compartment 125 or outwardly in the direction of the tower 102. The struts 134*a*, 134*b* extend between the bottom casing 126 and a respective compression support 148*a*, 148*b*, which are disposed approximately centrally beneath the working frame 120, see FIG. 5.

Preferably the compression supports 148*a*, 148*b* are oriented radially relative to an axis of rotation of the generator of the wind turbine. When the generator is arranged centrally the compression supports 148*a*, 148*b* extend substantially vertically downwardly from the working frame 120.

By virtue of a partly transparent bottom casing 126 and a faded-out roof casing 126 FIG. 6 once again diagrammatically shows the structural configuration of the nacelle 104. It is particularly clearly apparent from FIG. 6 how the first fixing devices 132*a*, 132*b* are arranged in conjunction with the working frame 120 to ensure that the bottom casing 126 can be lowered in the direction of the arrow Pi and guided. FIG. 6 also shows that the available working space on the working frame 120 remains constant, irrespective of the position of the bottom casing 126. As long as the nacelle base compartment 125 therefore does not have to be accessed it is immaterial in regard to maintaining the wind turbine 100 whether the nacelle base compartment is lowered or raised. This therefore affords a variable design which, for each location at which the wind turbine is erected, affords an advantageous compromise between low (cross) wind resistance on the one hand and generous working space on the other hand.

The invention claimed is:

1. A nacelle of a wind turbine comprising:
a machine carrier adapted to be installed on a tower of the wind turbine and to carry a generator and a rotor hub of the wind turbine;
a working frame installed on the machine carrier and having one or more working planes; and
a nacelle housing including a roof casing and a movable bottom casing, wherein the roof casing and the movable bottom casing enclose the machine carrier and the working frame providing protection from weather influences, wherein the movable bottom casing of the nacelle housing forms a nacelle base compartment accessible from the working frame, wherein the movable bottom casing is configured to move between a raised position and a lowered position,
wherein the nacelle base compartment is below the working frame and configured to support maintenance personnel in the lowered position, while continuing to enclose the machine carrier and the working frame in combination with the roof casing.

2. The nacelle according to claim 1 wherein the bottom casing is adapted to be movable in a vertical direction relative to the working frame between the raised position and the lowered position.

3. The nacelle according to claim 2 comprising one or more fixing devices mounted between the working frame and the bottom casing.

4. The nacelle according to claim 3 wherein the one or more fixing devices are adapted to fix the bottom casing selectively at least in the raised position.

5. The nacelle according to claim 4 wherein the one or more fixing devices are first fixing devices and the nacelle has one or more second fixing devices, which at least in the lowered position of the bottom casing is connected to the bottom casing and the working frame.

6. The nacelle according to claim 5 wherein the one or more second fixing devices are a plurality of struts.

7. The nacelle according to claim 3 wherein the one or more fixing devices respectively have a rail fixed to the bottom casing or the working frame and a rail receiver corresponding to the rail and fixed to the other of the working frame or the bottom casing.

8. The nacelle according to claim 2 wherein the bottom casing is coupled to the working frame by one or more hoist mechanisms, wherein the hoist mechanisms are chain hoists or cable hoists.

9. A wind turbine comprising:
a tower, and
the nacelle according to claim 1 arranged rotatably on the tower, wherein the machine carrier carries the generator and the rotor hub, wherein a plurality of rotor blades are arranged on the rotor hub.

10. The nacelle according to claim 1 wherein the roof casing overlaps a portion of the movable bottom casing when in the raised position and forms an overlapped portion.

11. The nacelle according to claim 10 wherein when the movable bottom casing moves from the raised position to the lowered position, the overlapped portion of the movable bottom casing moves within the roof casing.

12. A nacelle of a wind turbine comprising:
a machine carrier adapted to be installed on a tower of the wind turbine and to carry a generator and a rotor hub of the wind turbine;
a working frame installed on the machine carrier and having one or more working planes; and
a nacelle housing that encloses the machine carrier and the working frame providing protection from weather influences, wherein the nacelle housing has a nacelle base compartment accessible from the working frame, wherein the nacelle housing has a bottom casing delimiting the nacelle base compartment,
wherein the nacelle base compartment is below the working frame and configured to support maintenance personnel,
wherein the bottom casing is adapted to be movable in a vertical direction relative to the working frame,
wherein the bottom casing, at two opposite sides, has laterally outwardly extending projections, wherein a roof casing at two corresponding oppositely disposed sides has laterally inwardly extending steps, and wherein the projections and the steps are in contact with each other when the bottom casing is in a lowered position.

13. A method comprising:
maintaining a wind turbine, wherein the wind turbine has a nacelle having a nacelle housing that includes a roof casing and a movable bottom casing, which is movable between a raised position and a lowered position, wherein the nacelle housing encloses a machine carrier and a working frame and provides protection from weather influences, wherein the nacelle housing has a nacelle base compartment accessible from the working frame, wherein the bottom casing delimits the nacelle base compartment, wherein maintaining comprises:

a maintenance personnel entering the nacelle housing, lowering the bottom casing to the lowered position and
   thereby enlarging a volume of the nacelle base compartment,
the maintenance personnel entering the nacelle base compartment when the nacelle base compartment is in the lowered position.

14. The method according to claim 13 wherein the nacelle base compartment is fixed in the lowered position.

15. The method according to claim 13 further comprising:
detecting a cross wind loading acting on the nacelle housing,
comparing the cross wind load to a threshold value, and
raising the nacelle base compartment in response to the threshold value of the detected cross wind loading being reached or exceeded.

\* \* \* \* \*